United States Patent
Tsujimoto (10) Patent No.: US 9,106,779 B2
(45) Date of Patent: Aug. 11, 2015

(54) COMMUNICATION APPARATUS AND COMMUNICATION SYSTEM

(71) Applicant: Yoshiyuki Tsujimoto, Nagoya (JP)

(72) Inventor: Yoshiyuki Tsujimoto, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/195,090

(22) Filed: Mar. 3, 2014

(65) Prior Publication Data

US 2014/0253949 A1 Sep. 11, 2014

(30) Foreign Application Priority Data

Mar. 5, 2013 (JP) .................. 2013-042694

(51) Int. Cl.
   G06F 15/00 (2006.01)
   H04N 1/00 (2006.01)

(52) U.S. Cl.
   CPC ......... *H04N 1/0084* (2013.01); *H04N 1/00411* (2013.01); *H04N 1/00925* (2013.01); *H04N 1/00233* (2013.01); *H04N 2201/006* (2013.01); *H04N 2201/0036* (2013.01); *H04N 2201/0094* (2013.01)

(58) Field of Classification Search
   USPC ........................................................ 358/1.14
   See application file for complete search history.

(56) References Cited

U.S. PATENT DOCUMENTS

| 2005/0130706 A1 | 6/2005 | Yamamoto |
| 2011/0286028 A1 | 11/2011 | Kinouchi et al. |
| 2011/0292445 A1* | 12/2011 | Kato ............................ 358/1.15 |
| 2012/0105369 A1 | 5/2012 | Nakamura |
| 2013/0155450 A1 | 6/2013 | Higashikawa |
| 2014/0135036 A1 | 5/2014 | Bonanni et al. |

FOREIGN PATENT DOCUMENTS

| JP | 2004-222198 A | 8/2004 |
| JP | 2005-020158 A | 1/2005 |
| JP | 2007-067818 A | 3/2007 |
| JP | 2011-103572 A | 5/2011 |
| JP | 2011-182080 A | 9/2011 |
| JP | 2011-223511 A | 11/2011 |
| JP | 2012-095180 A | 5/2012 |
| JP | 2012-160207 A | 8/2012 |
| JP | 2013-147015 A | 8/2013 |

OTHER PUBLICATIONS

Notice of Allowance dated Oct. 7, 2014 from related U.S. Appl. No. 14/178,666.

* cited by examiner

*Primary Examiner* — Saeid Ebrahimi Dehkord
(74) *Attorney, Agent, or Firm* — Scully, Scott, Murphy & Presser, P.C.

(57) ABSTRACT

A communication apparatus includes: a communicating device configured to communicate with a mobile terminal according to a short distance wireless communication standard; at least one input receiver each configured to receive an input; and a controller configured to execute a processing related to the input received by the at least one input receiver. The controller is configured to execute: an approach detection processing in which the controller detects an approach of the mobile terminal to the communicating device; and a disabling processing in which the controller disables at least a portion of the at least one input receiver in response to detection of the approach of the mobile terminal in the approach detection processing.

18 Claims, 10 Drawing Sheets

COMMUNICATION APPARATUS AND COMMUNICATION SYSTEM

CROSS REFERENCE TO RELATED APPLICATION

The present application claims priority from Japanese Patent Application No. 2013-042694, which was filed on Mar. 5, 2013, the disclosure of which is herein incorporated by reference in its entirety.

BACKGROUND OF THE INVENTION

1. Field of the Invention

The present invention relates to a technique for preventing a communication apparatus from performing an operation unintended by a user.

2. Description of the Related Art

There is known a multi-function peripheral (MFP) whose operation panel unit includes an interface for short distance wireless communication. In this MFP, when a mobile terminal is placed near the interface, the MFP and the mobile terminal start communicating with each other via the interface.

SUMMARY OF THE INVENTION

However, when the user brings the mobile terminal into close proximity to a communication apparatus such as the MFP, a user's hand may accidentally touch an operating portion, e.g., the operation panel, of the communication apparatus, causing the MFP to perform an operation not intended by the user.

This invention has been developed to provide a technique for preventing a communication apparatus from performing an operation not intended by a user when the communication apparatus communicates with a mobile terminal according to a short distance wireless communication standard.

The present invention provides a communication apparatus comprising: a communicating device configured to communicate with a mobile terminal according to a short distance wireless communication standard; at least one input receiver each configured to receive an input; a controller configured to execute a processing related to the input received by the at least one input receiver, the controller being configured to execute: an approach detection processing in which the controller detects an approach of the mobile terminal to the communicating device; and a disabling processing in which the controller disables at least a portion of the at least one input receiver in response to detection of the approach of the mobile terminal in the approach detection processing.

The present invention also provides a communication system, comprising: a mobile terminal configured to perform communication according to a short distance wireless communication standard; and the communication apparatus.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which.

DETAILED DESCRIPTION OF THE EMBODIMENTS

First Embodiment

Hereinafter, there will be described a first embodiment of the present invention by reference to FIGS. 1-7.

1. Structures of MFP 10 and Mobile Terminal U

Figure 1:
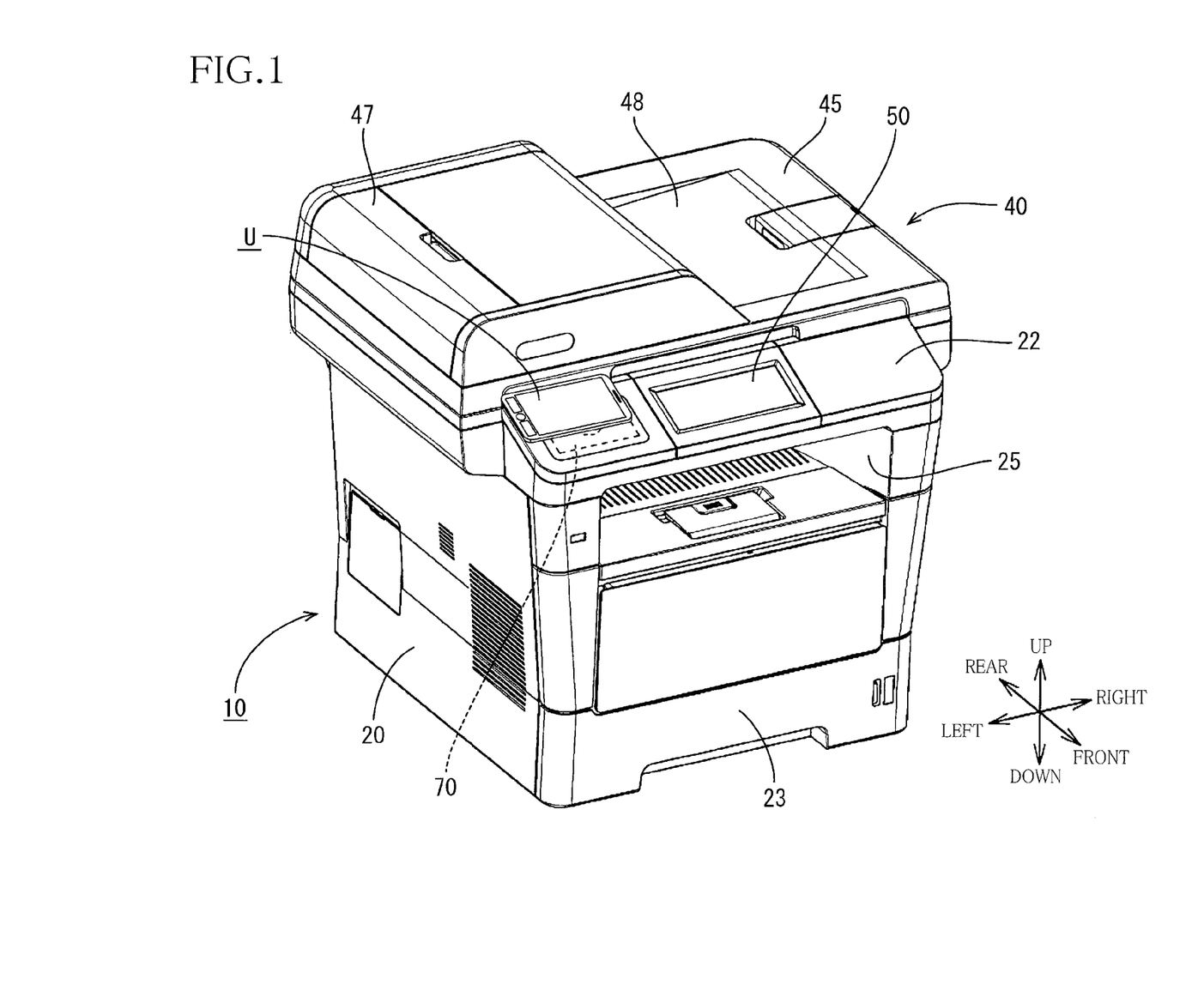
FIG. 1 is a perspective view illustrating a multi-function peripheral (MFP) according to a first embodiment.
Figure 2:
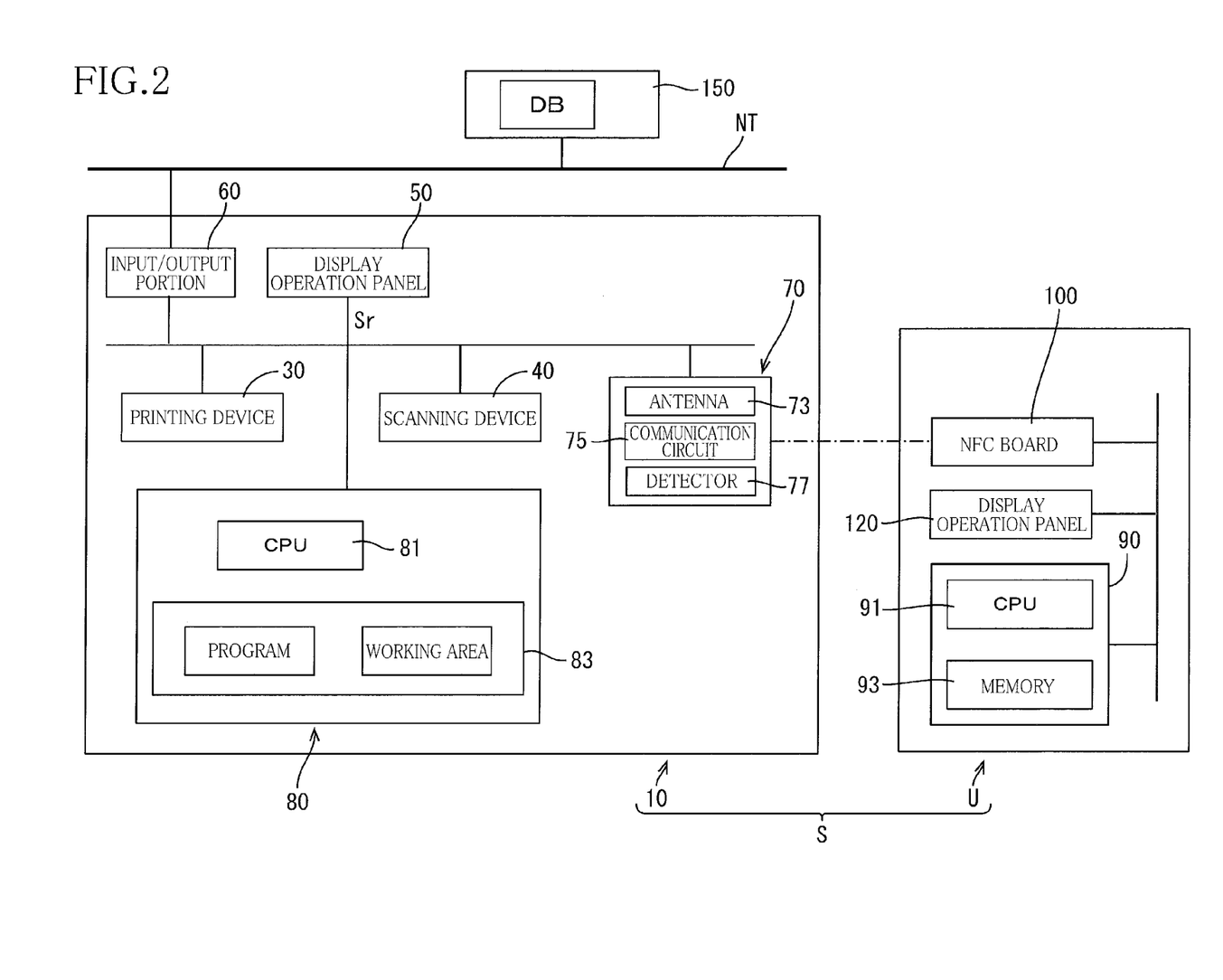
FIG. 2 is a block diagram illustrating electric configurations of a mobile terminal and the MFP.

FIG. 1 illustrates a multi-function peripheral (MFP) 10 according to the present embodiment. FIG. 2 illustrates electric configurations of the MFP 10 and a mobile terminal or device U. The MFP 10 is one example of a communication apparatus and has various functions such as a communicating function, a scanning function, and a printing function.

The MFP 10 includes a housing 20 shaped like a box and a flatbed scanning device 40 disposed on the housing 20. A printing device 30 is accommodated in the housing 20. A supply tray 23 is fitted in a lower portion of the housing 20 so as to be mounted and removed from an opening formed in a front surface of the housing 20. A sheet supplied from the supply tray 23 is fed to the printing device 30 through a sheet conveyance path, not shown. The printing device 30 records an image on the sheet, and the recorded sheet is discharged onto a sheet-output portion 25 provided at a central portion of the housing 20.

The scanning device 40 includes: a reading device, not shown, such as a CCD and a CIS; a document placement glass, not shown; and a document cover 45. After a user opens the document cover 45 and places a document on the document placement glass, the scanning device 40 moves the reading device in a right and left direction of the MFP 10 in a state in which the document cover 45 is closed, whereby the scanning device 40 can read an image on the document. It is noted that the document cover 45 is equipped with an ADF 47 that can one by one convey documents placed on a document placing portion 48.

The housing 20 of the MFP 10 has a front upper surface 22 on which an NFC (Near Field Communication) board 70 and a display operation panel 50 are arranged next to each other. The display operation panel 50 is disposed at a generally central portion of the front upper surface 22. The display operation panel 50 is constituted by: a touch panel such as a resistive film touch panel and a capacitive touch panel; and a liquid crystal display panel which are superposed on each other in a thickness direction of the display operation panel 50. This construction allows the user to perform various input operations by touching or pressing one or some of operation keys K (as one example of an input receiver) displayed on the touch panel.

The NFC board 70 is mounted on a left portion of the front upper surface 22. The NFC board 70 communicates with the mobile terminal U according to a short distance (near field) wireless communication standard (hereinafter referred to as "NFC standard") and includes a loop antenna 73, a communication circuit 75, and a detector 77. It is noted that communication according to the NFC standard (hereinafter may be referred to as "NFC communication") is performed according to ISO/IEC 21481 or ISO/IEC 18092.

The loop antenna 73 transmits and receives radio waves to communicate with a partner device according to the NFC standard. The communication circuit 75 executes signal processing for radio waves received and to be transmitted. The detector 77 detects a current flowing through the loop antenna 73 to detect intensity of a radio wave received by the loop antenna 73 (i.e., a receiving wave) and intensity of a radio wave transmitted from the loop antenna 73 (i.e., a transmitting wave). It is noted that the NFC board 70 is one example of a communicating device and functions as an NFC interface.

There will be next explained the electric configurations of the mobile terminal U and the MFP 10 with reference to FIG. 2. The mobile terminal U is a mobile phone such as a smartphone. The mobile terminal U includes a terminal controller 90, an NFC board 100, and a display operation panel 120.

The terminal controller 90 includes a central processing unit (CPU) 91 and a memory 93. The memory 93 includes a ROM and a RAM, for example, and the ROM stores an OS and various programs such as a print application program for causing the MFP 10 to execute a print processing and a reading application program for causing the MFP 10 to execute a scan processing.

The CPU 91 controls components of the mobile terminal U according to the program read from the ROM. It is noted that the application program may be installed on the mobile terminal U, for example, from a server provided by a vender of the MFP 10 or from a media shipped together with the MFP 10. Alternatively, the application program may be preinstalled on the mobile terminal U.

Like the NFC board 70 of the MFP 10, the NFC board 100 includes a loop antenna, not shown, a communication circuit, not shown, and a detecting circuit, not shown. The NFC board 100 is mounted in a back portion of the mobile terminal U (noted that the display operation panel 120 is provided on a front portion of the mobile terminal U). The NFC board 100 functions as an NFC interface which allows the terminal controller 90 to perform communication according to the NFC standard.

The display operation panel 120 is provided on the front portion of the mobile terminal U. Specifically, the display operation panel 120 is provided on an upper surface of the mobile terminal U. The display operation panel 120 is constituted by: a touch panel such as a resistive film touch panel and a capacitive touch panel; and a liquid crystal display panel which are superposed on each other in a thickness direction of the display operation panel 120. This construction allows the user to perform various input operations by touching or pressing one or some of operation keys displayed on the touch panel. The display operation panel 120 can display various setting screens and operating states of the MFP 10, for example.

The MFP 10 includes a controller 80, the NFC board 70, an input/output portion 60, the display operation panel 50, the printing device 30, and the scanning device 40 and constitutes a communication system S with the mobile terminal U. The printing device 30 is one example of a printing device which prints an image on a recording sheet based on print data. An electro-photographic printer and an ink-jet printer may be used as the printing device 30. The scanning device 40 reads an image on a document.

The controller 80 includes a CPU 81 and a memory 83. The memory 83 is constituted by a ROM, a RAM, a hard disc, and other similar devices. The memory 83 stores programs and other similar data executable by the CPU 81. The CPU 81 executes various processings according to the programs stored in the memory 83. By executing the processings according to the programs, the CPU 81 controls the printing device 30 and the scanning device 40 respectively to execute the print processing and an image reading processing, executes a communication processing using the NFC board 70 to communicate with the mobile terminal U, and executes a disabling sequence for disabling operation keys K1 which will be described below. Also, the MFP 10 is connected to a network NT via the input/output portion 60. A server 150 is connected to the network NT, so that the MFP 10 can access the server 150 over the network NT.

2. Disabling Processing for Disabling Operation Keys K1

In order for the mobile terminal U to communicate with the MFP 10 according to the NFC standard, the mobile terminal U needs to be brought into close proximity to the NFC board 70 of the MFP 10 such that a distance L between the NFC boards 70, 100 communicating with each other is equal to or shorter than a predetermined communication distance. In the MFP 10, as illustrated in FIG. 1, the NFC board 70 and the display operation panel 50 are arranged next to each other on the front upper surface 22 of the MFP 10. Thus, when the mobile terminal U is brought near the NFC board 70 of the MFP 10, a user's hand may accidentally touch the display operation panel 50 and operate one of the operation keys K1, leading to an operation of the MFP 10 which is unintended by the user.

Figure 3:
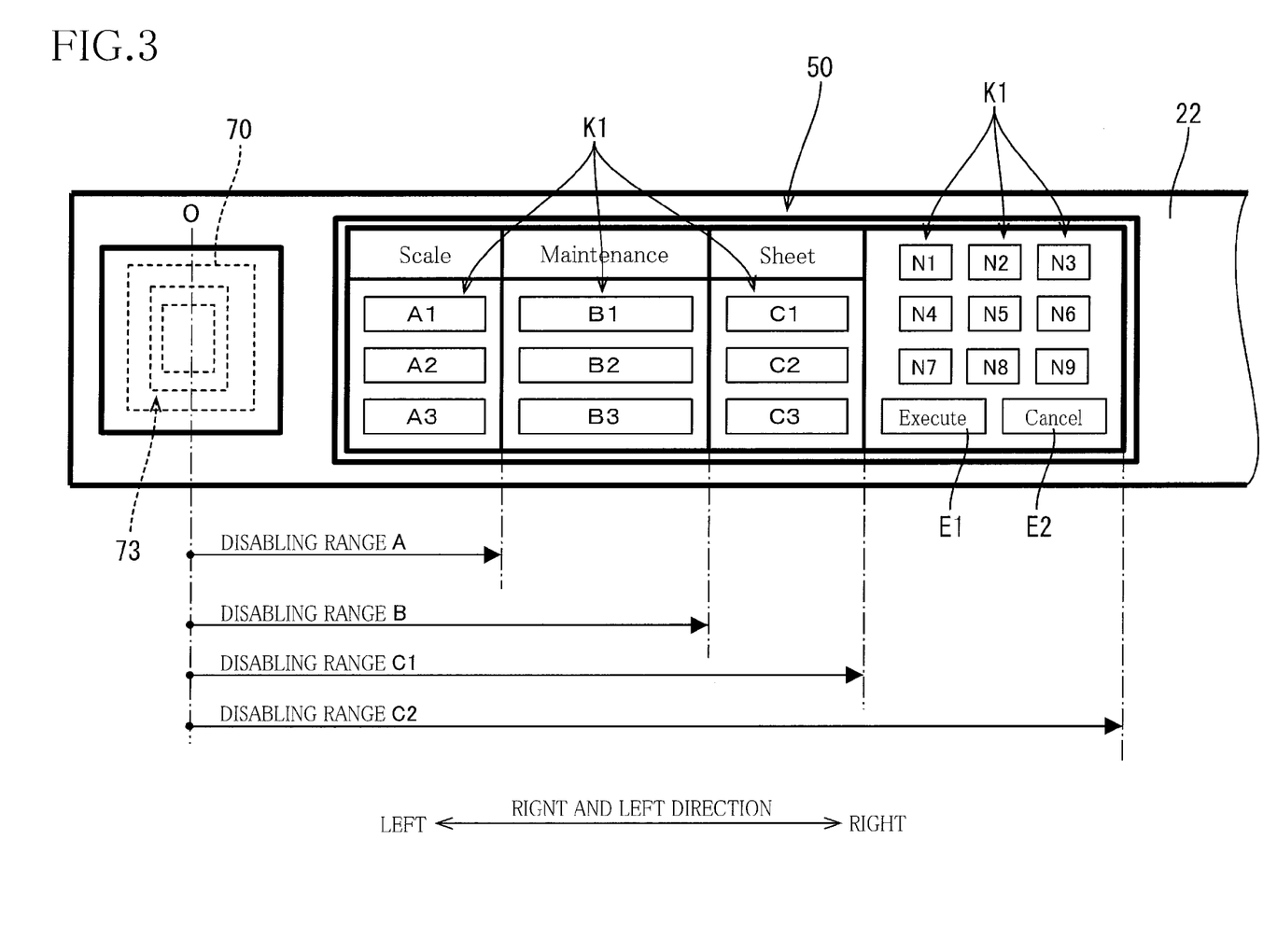
FIG. 3 is a plan view of a front upper surface of the MFP, illustrating disabling ranges for operation keys.

As illustrated in FIG. 3, the operation keys K1 displayed on the display operation panel 50 of the MFP 10 include: scale keys A1, A2, A3 for determining a scale of printing; maintenance keys B1, B2, B3 for executing maintenance; sheet keys C1, C2, C3 for determining a sheet; numeric keys N1-N9; an Execute key E1; and a Cancel key E2. If the user unintentionally touches one of the maintenance keys B1-B3 displayed on the display operation panel 50, the MFP 10 causes unnecessary maintenance (e.g., test printing) which is not intended by the user.

To solve this problem, the MFP 10 executes a disabling processing in which the MFP 10 detects an approach of the mobile terminal U and disables some or all of the operation keys K1. Specifically, when one of the operation keys K1 is operated in a normal state (i.e., a state in which the MFP 10 is not detecting the approach of the mobile terminal U), an operation signal Sr corresponding to the operated operation key K1 is transmitted to the controller 80. The transmitted operation signal Sr contains positional information of the operation key K1. Thus, the controller 80 recognizes the operated operation key K1 based on the positional information contained in the received operation signal Sr and executes a processing assigned to the operation key K1. When the operation signal Sr is received in a state in which the MFP 10 is detecting the approach of the mobile terminal U, the controller 80 compares the positional information of the operation key K1 with a disabling range which is a range or an area within which the operation keys K1 are disabled. When the operated operation key K1 is located within the disabling range, the MFP 10 disables the operation signal Sr, assuming that the signal has not been received. In this configuration, even if the user unintentionally touches one of the operation keys K1 located within the disabling range, the MFP 10 disables the operation, preventing the MFP 10 from performing an operation not intended by the user.

Figure 4:
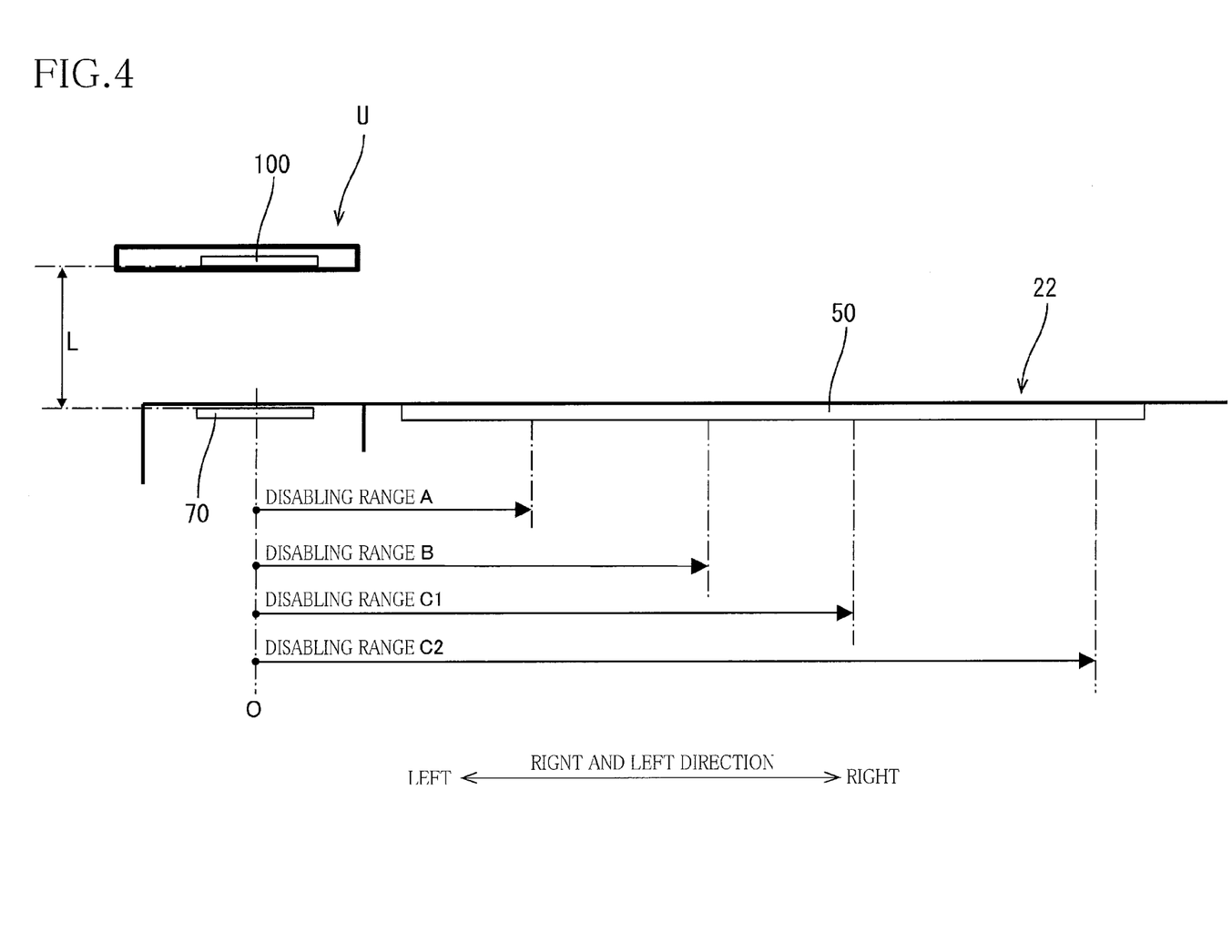
FIG. 4 is a vertical cross-sectional view of the front upper surface of the MFP, illustrating the disabling ranges for the operation keys.

As illustrated in FIGS. 3 and 4, the MFP 10 detects the distance L between the NFC board 100 of the mobile terminal U and the NFC board 70 of the MFP 10 and extends the disabling range with decrease in the detected distance L. In other words, the shorter the detected distance L is, the larger the disabling range is made. Specifically, the MFP 10 compares the detected distance L with a threshold value, and in a case where the detected distance L is less than the threshold value, the disabling range is made larger than in a case where the detected distance L is greater than the threshold value.

This configuration can more reliably prevent the MFP 10 from performing the operation not intended by the user, while minimizing the number of the operation keys K1 to be disabled. Specifically, if all the operation keys K1 are disabled when the approach of the mobile terminal U is detected, the user cannot perform necessary operations, and accordingly the number of the operation keys K1 to be disabled is preferably made as small as possible. Meanwhile, it is considered that an area which the user may touch increases or extends with the shorter distance L. Therefore, by increasing the disabling range with the shorter detected distance L, the MFP 10 can generally disable the operation keys K1 located within the area which the user may touch, following the increase in the area. Accordingly, it is possible to more reliably prevent the MFP 10 from performing the operation not intended by the user, while minimizing the number of the operation keys K1 to be disabled.

3. Disabling Sequence for Disabling Operation Keys K1

Figure 5:
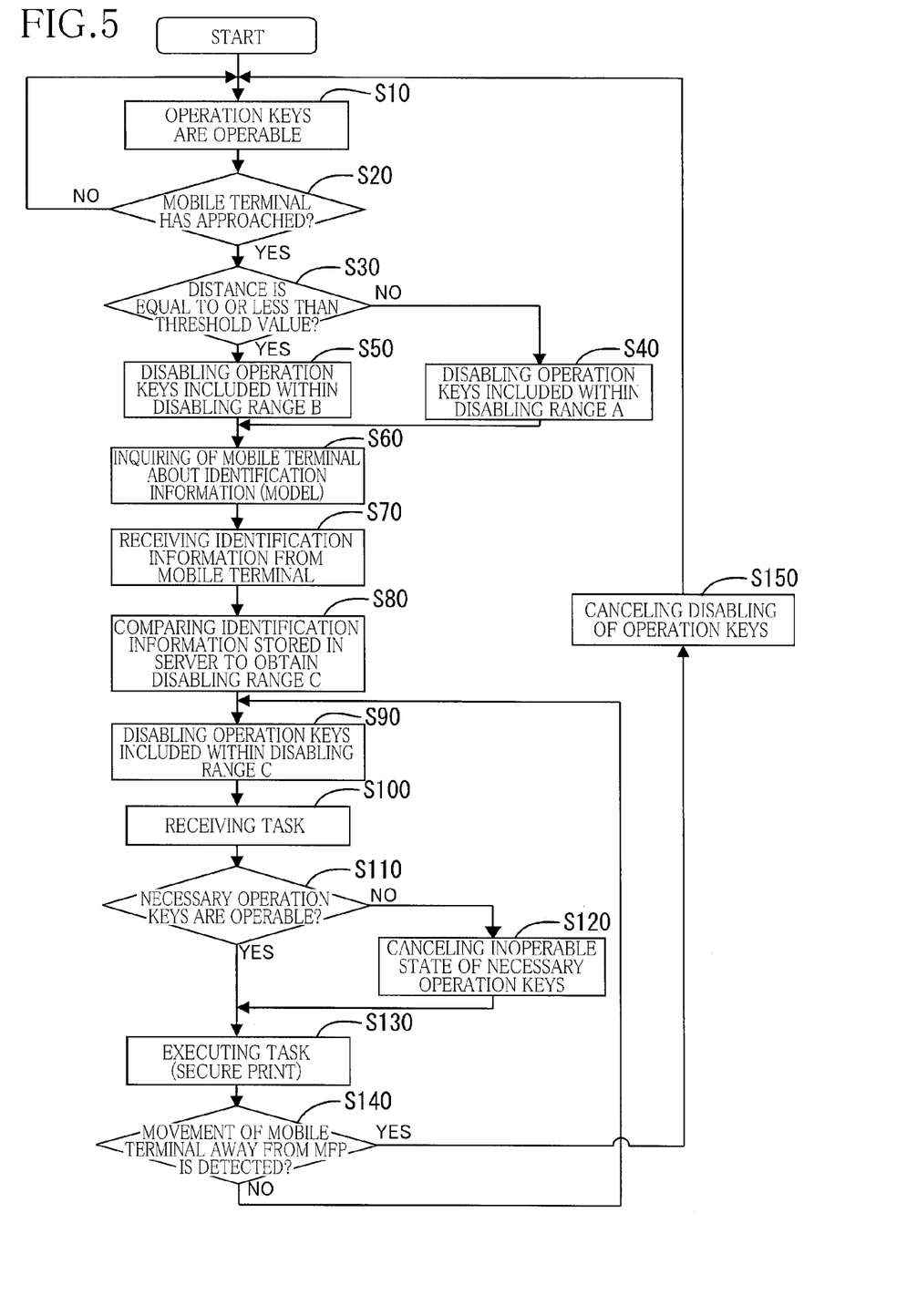
FIG. 5 is a flow chart illustrating a disabling processing.
Figure 6:
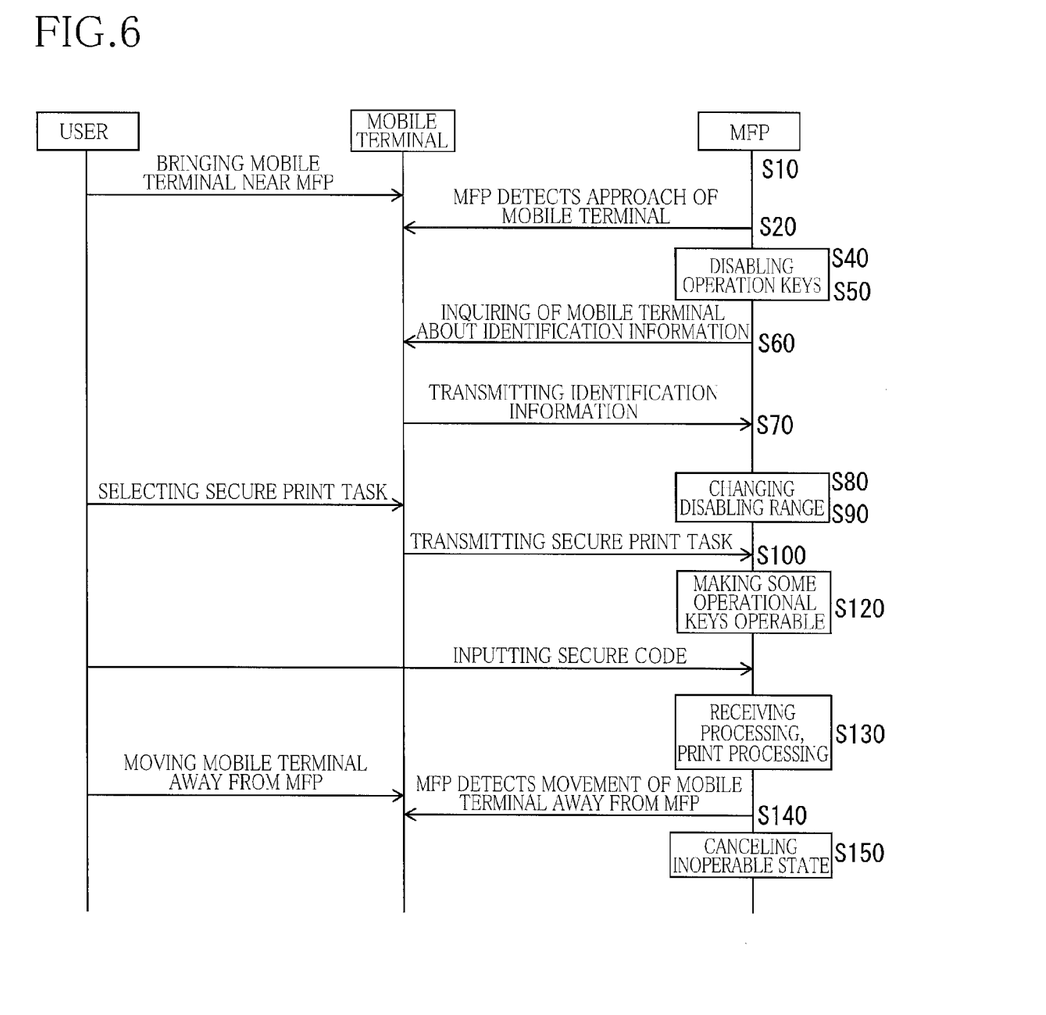
FIG. 6 is a sequence diagram illustrating a mutual relationship between the mobile terminal and the MFP when a task is executed.

There will be next explained, with reference to FIGS. 5 and 6, a disabling sequence to be executed by the controller 80 of the MFP 10 to disable the operation keys K1.

The disabling sequence is executed when the MFP 10 is turned on, and this disabling sequence begins with at S10 at which the controller 80 establishes an inactive state of a disabling function for disabling the operation keys. When the disabling function is in inactive, the operation keys K1 displayed on the display operation panel 50 are active (i.e., in the normal state). Accordingly, when one of the operation keys K1 displayed on the display operation panel 50 is touched or pressed, the MFP 10 receives the operation signal Sr from the operation key K1 and executes a processing related to the input operation for the operation key K1.

Then, the controller 80 at S20 executes an approach detection processing for detecting an approach of the mobile terminal U and determining whether the mobile terminal U has approached the NFC board 70 or not. It is noted that the approach means that the distance L between the NFC board 100 of the mobile terminal U and the NFC board 70 of the MFP 10 becomes equal to or shorter than the communication distance, e.g., 50 mm.

Here, the approach detection processing is explained in detail. In a case where the NFC communication is performed between two devices, one of the two devices typically transmits a radio wave for polling to check a partner device. When a distance between the two devices communicating with each other becomes equal to or shorter than the communication distance, the partner device receives the radio wave for polling and uses load modulation to return a response signal St (i.e., a radio wave using a demagnetizing field) to the one device which has transmitted the radio wave for polling.

Accordingly, in a case where the NFC board 70 of the MFP 10 transmits a radio wave for polling in a state in which the mobile terminal U has not approached, for example, the mobile terminal U cannot receive the radio wave for polling. Thus, the mobile terminal U does not transmit the response signal St to the MFP 10 by using the load modulation.

In the approach detection processing, the controller 80 determines whether the MFP 10 has received, via the NFC board 70, the response signal St using the load modulation from the mobile terminal U or not during a period over which the MFP 10 uses the NFC board 70 to transmit the radio wave for polling. When the MFP 10 does not receive the response signal St using the load modulation even though transmitting the radio wave for polling, the controller 80 determines that the mobile terminal U has not approached the NFC board 70 (S20: NO).

When the user has brought the mobile terminal U near the NFC board 70 of the MFP 10 to establish NFC communication between the mobile terminal U and the MFP 10, and the distance L between the NFC board 100 of the mobile terminal U and the NFC board 70 of the MFP 10 becomes shorter than the communication distance, the radio wave for polling transmitted from the NFC board 70 of the MFP 10 is received by the mobile terminal U.

In response, the mobile terminal U having received the radio wave for polling uses the load modulation to transmit the response signal St to the MFP 10, and the controller 80 of the MFP 10 receives the response signal St via the communication circuit 75 of the NFC board 70. Based on the receipt of the response signal St, the controller 80 of the MFP 10 detects the approach of the mobile terminal U (S20: YES).

When the controller 80 has detected the approach of the mobile terminal U, this flow goes to S30. At S30, the controller 80 calculates the distance L between the NFC board 100 of the mobile terminal U and the NFC board 70 of the MFP 10 and determines whether or not the calculated distance L is equal to or less than a threshold value which is less than the communication distance and is, for example, 30 mm.

Figure 7:
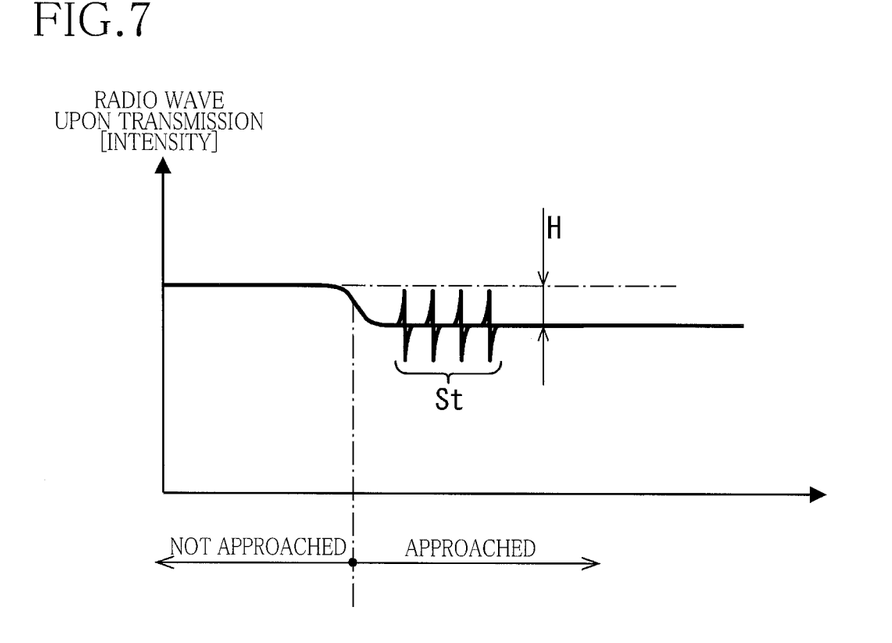
FIG. 7 is a view illustrating intensity of a radio wave transmitted from an NFC board of the MFP.

Specifically, affected by a demagnetizing field generated by a loop antenna of the mobile terminal U, the intensity of the radio wave transmitted from the loop antenna 73 of the MFP 10 is weaker in the case where the mobile terminal U has approached the NFC board 70 than in the case where the mobile terminal U has not approached the NFC board 70 (see FIG. 7). The demagnetizing field increases with the shorter distance L, lowering the intensity of the radio wave transmitted from the MFP 10. Accordingly, by using the detector 77 of the NFC board 70 to detect the intensity of the radio wave transmitted from the loop antenna 73 (i.e., a transmitting wave) for each of the case where the mobile terminal U has not approached the NFC board 70 and the case where the mobile terminal U has approached the NFC board 70 and by calculating an amount H of lowering in the intensity of the radio wave, the distance L can be obtained based on the calculated amount H of lowering in the intensity of the radio wave. For example, in a configuration in which data representing a correlation between the distance L and the amount H of lowering in the intensity of the radio wave is stored in the memory 83, the distance L can be obtained based on the data.

The controller 80 at S30 compares the obtained distance L with the threshold value. When the distance L is greater than the threshold value (in this example, the distance L is ranged between 30 mm and 50 mm), a negative decision is made at S30, and this flow goes to S40. At S40, the controller 80 disables operation keys K1 included within a disabling range A illustrated in FIGS. 3 and 4. The disabling range A includes the scale keys A1-A3 for determining the scale of printing, and accordingly these scale keys A1-A3 are disabled.

On the other hand, when the distance L is equal to or less than the threshold value (in this example, when the distance L is equal to or shorter than 30 mm), a positive decision is made at S30, and this flow goes to S50. At S50, the controller 80 disables operation keys K1 included within a disabling range B illustrated in FIGS. 3 and 4. The disabling range B is broader than the disabling range A and includes the scale keys A1-A3 for determining the scale of printing, and the maintenance keys B1-B3 for performing the maintenance. Thus, the scale keys A1-A3 and the maintenance keys B1-B3 are disabled.

In this embodiment, each disabling range for disabling the operation keys K1 extends from a center O of the NFC board 70. This is because an area which the user may touch when bringing the mobile terminal U near the NFC board 70 of the MFP 10 is an area centered about the center O of the NFC board 70. Data about the disabling range A and the disabling range B is preferably stored in the memory 83 in advance and read from the memory 83 when the processings at S40 and S50 are executed.

Upon completion of disabling the operation keys K1 at S40 or S50 for the disabling range A or B, this flow goes to S60. The MFP 10 at S60 uses the NFC to inquire about identification information of the mobile terminal U (e.g., a model number).

When having received the inquiry about the identification information from the MFP 10, the mobile terminal U uses the NFC to transmit the identification information to the MFP 10. The identification information transmitted to the MFP 10 is at S70 received by the controller 80 of the MFP 10 via the NFC board 70.

When having received the identification information from the mobile terminal U, the controller 80 at S80 accesses the server 150 over the network NT to refer to a database DB of the server 150 to compare the identification information about the mobile terminal U with information stored in database DB. The database DB stores a disabling range C for each model of the mobile terminal U, allowing the controller 80 to obtain the disabling range C according to the model of the mobile terminal U.

The area which the user may unintentionally touch when bringing the mobile terminal U near the NFC board 70 of the MFP 10 to establish communication according to the NFC standard depends upon not only the distance L between the mobile terminal U and the NFC board 70 but also a shape of the mobile terminal U and a position of the NFC board 100 in the mobile terminal U. The disabling range C is preset based on information such as the shape of the mobile terminal U and the position of the NFC board 100.

When having obtained the disabling range C corresponding to the model of the mobile terminal U as the partner device, the controller 80 sets the obtained disabling range C on the basis of the position of the NFC board 70 mounted on the MFP 10. Then, the controller 80 at S90 changes or resets the disabling range A or B determined at S40 or S50 to the disabling range C to disable the operation keys K1 included within the disabling range C.

FIGS. 3 and 4 illustrate, by way of example, disabling ranges C1 and C2 as the disabling range C. In a case where the disabling range obtained from the server 150 is the disabling range C1 which includes: the scale keys A1-A3 for determining the scale of printing; the maintenance keys B1-B3 for performing the maintenance; and the sheet keys C1-C3 for determining the sheet, these operation keys A1-A3, B1-B3, and C1-C3 are disabled. In a case where the disabling range obtained from the server 150 is the disabling range C2 which includes not only the operation keys A1-A3, B1-B3, and C1-C3 but also the numeric keys N1-N9, the Execute key E1, and the Cancel key E2, these operation keys A1-A3, B1-B3, C1-C3, N1-N9, E1, and E2 are disabled. The controller 80 of the MFP 10 then waits for the mobile terminal U to transmit a task.

The user of the mobile terminal U can perform a touch operation on the display operation panel 120 to select a task to be executed by the MFP 10. In this example, it is assumed that the print application program is activated on the mobile terminal U, and the user has selected a secure print task.

After the selection of the secure print task, when the user has operated the display operation panel 120 of the mobile terminal U to command transmission of data, the secure print task containing print data is transmitted from the mobile terminal U to the MFP 10 over communication according to the NFC standard. The transmitted secure print task is at S100 received by the controller 80 of the MFP 10 via the NFC board 70.

When having received the task from the mobile terminal U, the controller 80 of the MFP 10 determines whether an operation key required for execution of the task can be used or not. In this example, execution of the secure print task requires the user to input a secure code (as one example of authentication information), and the numeric keys N1-N9 are used for the input of the secure code. Thus, the controller 80 at S110 determines whether the numeric keys N1-N9 can be used or not. Also, since the execution of the task includes a cancellation of the task, the controller 80 determines whether not only the numeric keys N1-N9 but also the Cancel key E2 can be used or not. The numeric keys N1-N9 and the Cancel key E2 are one example of at least one of the at least one input receiver which has a possibility of being used upon communication according to the short distance wireless communication standard.

When the disabling range C obtained from the server at S80 is the disabling range C1, this disabling range does no include the numeric keys N1-N9 and the Cancel key E2. Thus, in this case, a positive decision (YES) is made at S110, and this flow goes to S130.

When the disabling range C obtained from the server at S80 is the disabling range C2, on the other hand, this disabling range includes the numeric keys N1-N9 and the Cancel key E2. Thus, in this case, a negative decision (NO) is made at S110, and this flow goes to S120 at which the controller 80 cancels the inoperable state of the operation keys required for execution of the task. Accordingly, the inoperable state of the numeric keys N1-N9 and the Cancel key E2 is canceled and changed to the operable state in this example.

This flow then goes to S130 at which the controller 80 executes the task transmitted from the mobile terminal U. The task transmitted from the mobile terminal U is the secure print task in this example. Thus, when the user has used the numeric keys N1-N9 of the MFP 10 to input the secure code, the controller 80 receives the secure code that is input from the numeric keys N1-N9. The controller 80 compares the received secure code with a secure code attached to the print data transmitted from the mobile terminal U, and when these codes coincide with each other, the controller 80 controls the printing device 30 to print the print data.

Upon completion of the execution of the task (in this example, the secure print), the controller 80 of the MFP 10 at S140 executes a moving-away detection processing for detecting movement of the mobile terminal U away from the NFC board 70. The movement of the mobile terminal U away from the NFC board 70 is judged based on a status of communication of the MFP 10 with the mobile terminal U. That is, the controller 80 determines that the mobile terminal U has moved away in a case where communication with the mobile terminal U is broken off, in a case where a radio wave transmitted from the mobile terminal U has not been detected for a predetermined length of time, or in a case where a demagnetizing field disappears from a radio wave transmitting from the MFP 10. It is noted that the movement of the mobile terminal U away from the NFC board 70 means a state in which the distance L between the NFC board 100 of the mobile terminal U and the NFC board 70 of the MFP 10 becomes equal to or longer than the communication distance.

When the movement of the mobile terminal U away from the NFC board 70 is not detected (S140: NO), this flow goes to S90, and accordingly the operation keys K1 included within the disabling range C are kept inoperable. When the user moves the mobile terminal U away from the MFP 10, any of the above-described conditions is satisfied, so that the controller 80 detects the movement of the mobile terminal U away from the NFC board 70 (S140: YES). When having detected the movement of the mobile terminal U away from the NFC board 70, the controller 80 at S150 executes a cancellation processing for canceling disabling of the operation keys K1, in other words, the controller 80 changes the state of the operation keys K1 from the inoperable state to the operable state. This processing is executed because the movement of the mobile terminal U away from the NFC board 70 means movement of the user's hand away from the MFP 10, and accordingly there is a lower possibility that the user's hand accidentally touches any of the operation keys K1. As a result of this processing, all the operation keys K1 included within the disabling range C1 and the disabling range C2 become operable. Upon completion of the processing at S150, this flow returns to S10, and the MFP 10 returns to the initial state established when the MFP 10 is turned on.

4. Effects

The MFP 10 disables the operation keys K1 when the approach of the mobile terminal U is detected. Thus, even if the user has unintentionally touched any of the operation keys K1 when bringing the mobile terminal U near the NFC board 70 of the MFP 10 to establish the NFC communication, the MFP 10 performs an operation unintended by the user with a smaller possibility.

Also, the area or position where the user may unintentionally touch one of the operation keys K1 depends upon the distance L between the mobile terminal U and the NFC board 70. Since this MFP 10 compares the distance L between the mobile terminal U and the NFC board 70 with the threshold value to change the disabling range for disabling the operation keys K1 (S40, S50), the MFP 10 performs an operation unintended by the user with a smaller possibility.

The area or position where the user may unintentionally touch one of the operation keys K1 depends upon not only the distance L between the mobile terminal U and the NFC board 70 but also the shape of the mobile terminal U and the position of the NFC board 100 in the mobile terminal U. The MFP 10 refers to the server 150 to compare the identification information received from the mobile terminal U with the information stored in the database and resets the disabling range C according to the feature unique to the mobile terminal U (e.g., the shape and the position where the board is mounted), whereby the area which the user may touch with a high possibility and the disabling range C can generally fit or coincide with each other.

Accordingly, it is possible to more reliably prevent the MFP 10 from performing an operation unintended by the user. Also, since all the disabling ranges C corresponding to the identification information about the mobile terminal U are stored in the server 150, it is possible to save the user from having to register the disabling ranges C corresponding to the identification information with the MFP 10 in advance, and the MFP 10 does not need to store data about the disabling range C.

The MFP 10 cancels the disabling of the operation keys K1 when the movement of the mobile terminal U away from the NFC board 70 is detected. All the operation keys K1 can be used thereafter. Accordingly, a period in which some or all of the operation keys K1 are disabled is shorter than that in a case where the operation keys K1 continue to be disabled even after the mobile terminal U is moved away from the MFP 10.

When the operation keys K1 used for execution of a task are included within the disabling range C, the MFP 10 cancels disabling for the operation keys K1. Accordingly, the task transmitted from the mobile terminal U can be executed, resulting in higher convenience to the user.

The MFP 10 uses the radio wave transmitted by the mobile terminal U (i.e., the response signal St) to detect an approach of the mobile terminal U. Thus, the MFP 10 can detect the approach of the mobile terminal U using a well-known component used for communication according to the NFC standard. Also, the MFP 10 uses the radio wave detected by the NFC board 70 to recognize the distance L from the mobile terminal U to the NFC board 70 of the MFP 10. Accordingly, the distance L can also be detected using a well-known component.

In this MFP 10, the display operation panel 50 is provided on the front portion of the housing 20. The user usually stands in front of the MFP 10 when bringing the mobile terminal U near the NFC board 70 of the MFP 10. Accordingly, in the case where the display operation panel 50 is provided on the front portion of the housing 20, there is a high possibility that the user unintentionally touches any of the operation keys K on the display operation panel 50. When the present technique of disabling the operation keys is applied to the MFP 10 which may perform an operation unintended by the user with a high possibility, the operation unintended by the user can be less frequently caused.

Second Embodiment

In the first embodiment, the MFP 10 detects the approach of the mobile terminal U, based on the presence or absence of the response signal St returned from the mobile terminal U. That is, in a case where the response signal St using the load modulation is not returned even though the radio wave for polling is transmitted from the NFC board 70, the MFP 10 determines that the mobile terminal U has not approached, and in a case where the response signal St is returned from the mobile terminal U, the MFP 10 determines that the mobile terminal U has approached.

When the mobile terminal U transmits the radio wave in a period in which the MFP 10 is not transmitting the radio wave, the radio wave is received by the NFC board 70 of the MFP 10. Accordingly, the MFP 10 can determine whether the mobile terminal U has approached or not by using the detector 77 to detect intensity of the radio wave received by the NFC board 70 (i.e., the radio wave transmitted by the mobile terminal U) in the period in which the MFP 10 is not transmitting the radio wave. That is, when the intensity of the radio wave received by the NFC board 70 is greater than a boundary value (i.e., intensity of a radio wave received in a case where a device which transmits the radio wave is located within the communication distance), the MFP 10 can determine that the mobile terminal U has approached, and when the intensity of the radio wave is less than the boundary value, the MFP 10 can determine that the mobile terminal U has not approached.

The method of determining whether the mobile terminal U has approached or not based on the intensity of the radio wave received by the NFC board 70 can be used in combination with the method of making the determination based on the presence or absence of the response signal St in the first embodiment. Accordingly, in the second embodiment, these two methods are used in combination to detect whether the mobile terminal U has approached or not. That is, in the second embodiment, in a period in which the MFP 10 is transmitting the radio wave, the MFP 10 detects the approach of the mobile terminal U based on the presence or absence of the response signal St returned from the mobile terminal U, and in the period in which the MFP 10 is not transmitting the radio wave, the MFP 10 detects the approach of the mobile terminal U based on the intensity of the received radio wave.

This configuration allows the MFP 10 to detect the approach of the mobile terminal U both in the period in which the MFP 10 is transmitting the radio wave and in the period in which the MFP 10 is not transmitting the radio wave. Accordingly, the MFP 10 can more reliably detect the approach of the mobile terminal U.

The intensity of the radio wave received by the NFC board 70 in the period in which the MFP 10 is not transmitting the radio wave increases with decrease in the distance L between the mobile terminal U and the NFC board 70 of the MFP 10. Thus, the distance L between the mobile terminal U and the NFC board 70 of the MFP 10 can be determined based on the intensity of the received radio wave. Accordingly, when the approach of the mobile terminal U is detected based on receipt of the radio wave having intensity higher than the boundary value in the period in which the MFP 10 is not transmitting the radio wave, the distance L is determined based on the intensity of the received radio wave. Therefore, as in the first embodiment, the disabling range A and the disabling range B can be set according to the distance L.

Third Embodiment

Figure 8:
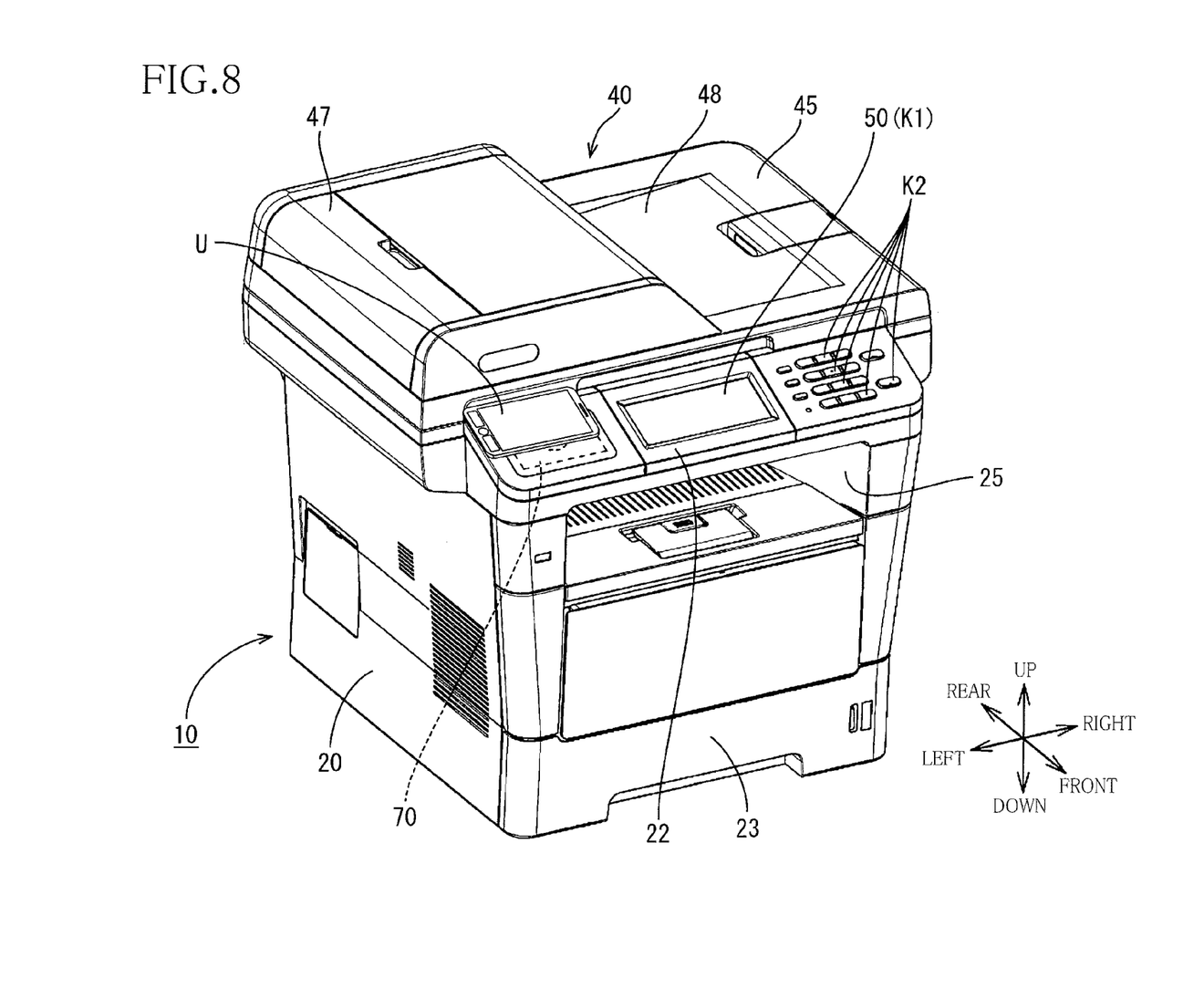
FIG. 8 is a perspective view illustrating an MFP according to a third embodiment.
Figure 9:
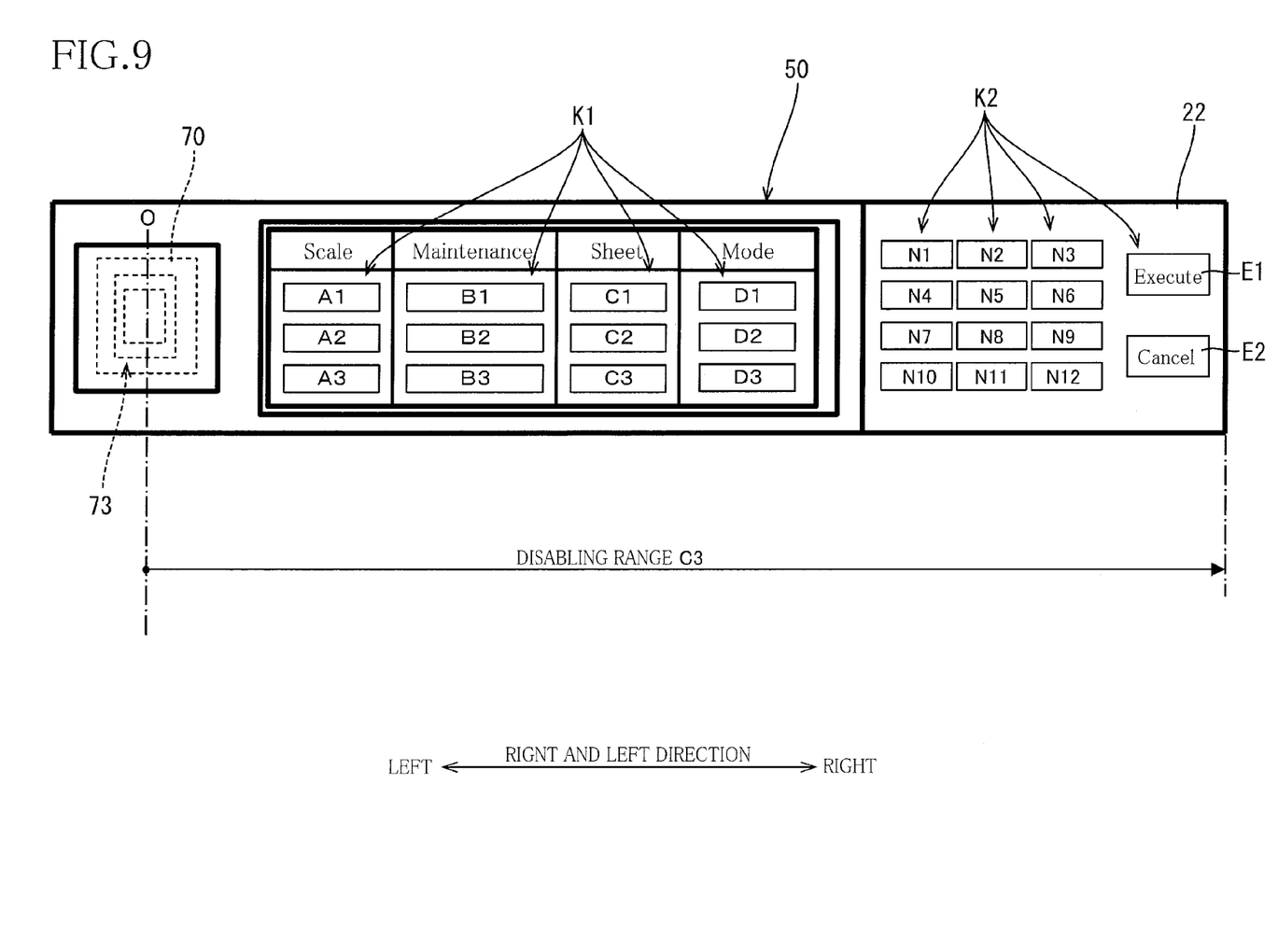
FIG. 9 is a plan view of a front upper surface of the MFP, illustrating disabling ranges for operation keys.

There will be next explained a third embodiment with reference to FIGS. 8 and 9. FIG. 8 illustrates an MFP according to the third embodiment, and FIG. 9 illustrates a front upper surface of the MFP (specifically, a disabling range for operation keys). In the first embodiment, the display operation panel 50 in the form of the touch panel is provided on the MFP 10. In this third embodiment, operation keys K2 in the form of push buttons are provided in addition to the display operation panel 50 in the form of the touch panel, allowing the user to perform input operations with the operation keys K1 displayed on the display operation panel 50 and the operation keys K2 in the form of the push buttons.

As illustrated in FIG. 8, the operation keys K2 in the form of the push buttons are provided at the right of the display operation panel 50 on the front upper surface 22 of the MFP 10. As illustrated in FIG. 9, the operation keys K2 in the form of the push buttons include numeric keys N1-N12, the Execute key E1, and the Cancel key E2, which allows the user to input a number, command execution of a task, and cancel a task.

When comparing a minimum operating force of the user which is required for each of the operation keys K1 to accept an input of the user and a minimum operating force of the user which is required for each of the operation keys K2 to accept an input of the user, the minimum operating force required for each operation key K2 is larger than the minimum operating force required for the operation key K1. In other words, a minimum pressing pressure required for each operation key K2 to accept an operation of the user when pressed is higher than a minimum pressing pressure required for each operation key K1 to accept or detect an operation of the user when pressed. Each operation key K2 is one example of a second input receiver, and each operation key K1 is one example of a first input receiver.

In the first embodiment, the MFP 10 executes the disabling sequence illustrated in FIG. 5, and when the mobile terminal U has approached the MFP 10, the MFP 10 set one of the predetermined disabling ranges A-C to disable the operation keys K1 included within the disabling range.

As in the first embodiment, the MFP 10 according to the third embodiment also executes the disabling sequence illustrated in FIG. 5, and when the mobile terminal U has approached the MFP 10, the MFP 10 sets one of the predetermined disabling ranges A-C and disables the operation keys K included within the one of the disabling ranges A-C.

However, each operation key K2 requiring the larger minimum operating force is registered in advance with the memory 83 as operation keys K not to be disabled. The controller 80 of the MFP 10 disables the operation keys K other than the operation keys K2 registered with the memory 83, in other words, the controller 80 disables only the operation keys K1 requiring the smaller minimum operating force. For example, as illustrated in FIG. 9, in a case where the operation keys K1 and the operation keys K2 are included within a disabling range C3, the controller 80 disables only the operation keys K1 and does not disable the operation keys K2.

The reason why the operation keys K2 requiring the larger minimum operating force are not disabled is that each operation key K2 requires the larger minimum operating force, and accordingly even if the user unintentionally touches the operation key K2, the operation key K2 less frequently accepts or detects the touch of the user, resulting in a low possibility in which the MFP 10 performs an operation unintended by the user. The minimum operating force F1 required for each operation key K1 is about zero N, for example (in the case of the capacitive touch panel), and the minimum operating force F2 required for each operation key K2 in the form of the push button is ranged between 7 N and 9 N, for example. An average pressing force F3 in a case where the user unintentionally touches the operation keys K is generally ranged between 3 N and 5 N and is larger than the minimum operating force F1 required for each operation key K1 and smaller than the minimum operating force F2 required for each operation key K2.

The input operations to be disabled increases with increase in the number of the operation keys K to be disabled, and accordingly the number of the operation keys K to be disabled is preferably small. In the third embodiment, in the case where the operation keys K1 and the operation keys K2 are included within the disabling range, the controller 80 disables only the operation keys K1 and does not disable the operation keys K2. Accordingly, in this configuration, the number of the operation keys K to be disabled can be made smaller than in a configuration in which the controller 80 disables the operation keys K1, K2 in the case where the operation keys K1, K2 are included within the disabling range, making it possible to reduce the number of the input operations to be disabled as small as possible.

Modifications

While the embodiments of the present invention have been described above, it is to be understood that the invention is not limited to the details of the illustrated embodiments, but may be embodied with various changes and modifications, which may occur to those skilled in the art, without departing from the spirit and scope of the invention.

(1) For example, while the mobile phone (e.g., the smartphone) is used as one example of the mobile terminal U in the first embodiment, the mobile terminal U may be any device as long as the device can communicate with the communication apparatus (the MFP in the above-described embodiments) according to the NFC standard. Examples of the mobile terminal U include a PDA, a laptop computer, a tablet PC, a portable music player, and a portable movie player.

Figure 10:
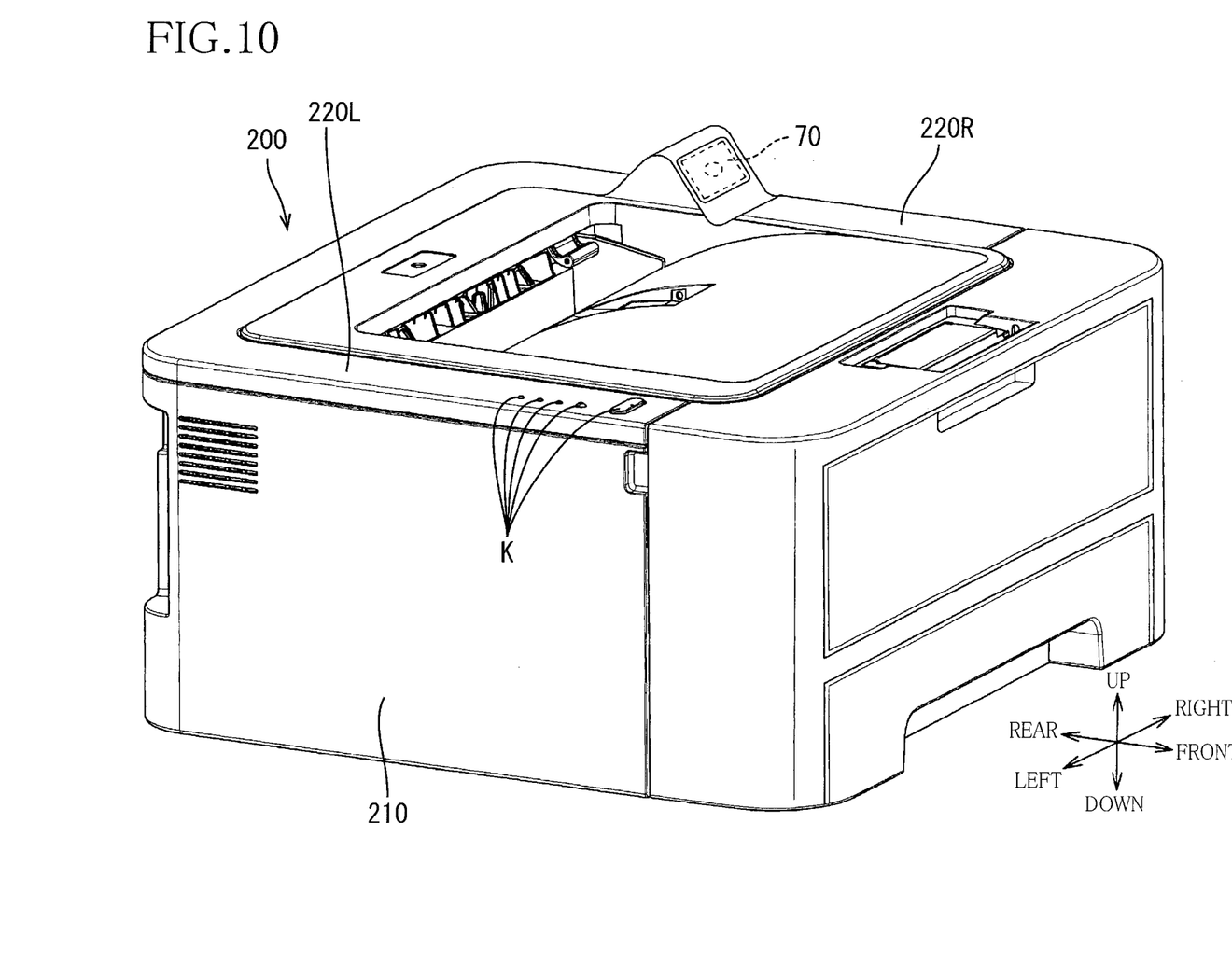
FIG. 10 is a perspective view illustrating a printing device according to another embodiment.

(2) The MFP 10 is used as one example of the communication apparatus in the first embodiment, but any device can be used as the communication apparatus as long as the device can communicate with the mobile terminal U according to the NFC standard. For example, a printer and a scanner may be used as the communication apparatus. Also, in the first embodiment, the controller 80 disables the operation keys K provided on the MFP 10 in which the NFC board 70 is disposed on the front upper surface 22 of the housing 20. However, the present invention is applicable to a communication apparatus in which the NFC board 70 is disposed at a position that differs from the front portion of the housing 20. For example, as illustrated in FIG. 10, the present invention may be applied to a printer 200 including a housing 210 having a right upper surface 220R on which the NFC board 70 is provided at a central portion thereof in a front and rear direction. Also, the operation keys K may not be provided on the front end portion of the housing 210. For example, as illustrated in FIG. 10, the housing 210 further has a left upper surface 220L on which the operation keys K may be provided at a central portion thereof in the front and rear direction. That is, the present invention may be applied to any communication apparatus as long as the communication apparatus has a possibility that the user's hand may touch any of the operation keys K when bringing the mobile terminal U near the NFC board 70.

(3) In the first embodiment, in the case where, after receipt of a task, the operation keys K to be used for execution of the task are disabled, the controller 80 cancels the inoperable state of the operation keys K. Operation keys K which are assumed to be used for execution of the task and/or operation keys K used with a high frequency may be registered in advance with the memory 83 as operation keys K not to be disabled, to exclude them from the operation keys to be disabled.

(4) In the first embodiment, the disabling range is changed according to the size of the mobile terminal U and the position of the NFC board 100. In a case where a gyro sensor or the like is mounted on the mobile terminal U, information about orientation may be obtained from the mobile terminal U using NFC communication to change or reset the direction or the size of the disabling range according to the orientation of the mobile terminal U.

(5) In the first embodiment, when the movement of the mobile terminal U away from the NFC board 70 is detected, the controller 80 cancels disabling of the operation keys K. Whether disabling of the operation keys K is to be canceled or continued may be determined by a command transmitted from an application running on the mobile terminal U, for example.

(6) While the NFC standard is used as the short distance wireless communication standard in the first embodiment, communication standards such as ISO/IEC 14443 and ISO/IEC 15693 may be used as the short distance wireless communication standard, for example.

(7) While the controller 80 is constituted by the CPU in the first embodiment, the controller 80 may be constituted by a physical circuit such as an ASIC and may be constituted by one or a plurality of CPUs and a physical circuit(s) such as the ASIC in combination.

What is claimed is:

1. A communication apparatus comprising:
   a communicating device configured to communicate with a mobile terminal according to a short distance wireless communication standard;
   an operation panel including at least one operation key each configured to accept an operation action;
   a controller configured to execute a processing related to the operation key which accepts the operation action,
   the controller being configured to execute:
      an approach detection processing in which the controller detects an approach of the mobile terminal to the communicating device;
      an enabling processing in which the controller enables the at least one operation key while not detecting the approach of the mobile terminal in the approach detection processing; and
      a disabling processing in which the controller disables the at least one operation key while detecting the approach of the mobile terminal in the approach detection processing.

2. The communication apparatus according to claim 1, wherein the controller is configured to, in the disabling processing, disable execution of control responsive to the operation action, while detecting the approach of the mobile terminal in the approach detection processing.

3. The communication apparatus according to claim 1, wherein the controller is configured to:
   detect the approach of the mobile terminal and detect a distance between the mobile terminal and the communicating device; and
   in the disabling processing, extend a disabling range corresponding to at least a portion of the at least one operation key, according to the distance detected by the controller.

4. The communication apparatus according to claim 3, wherein the controller is configured to determine the disabling range such that the shorter the distance detected by the controller is, the larger the disabling range is made.

5. The communication apparatus according to claim 3, wherein the controller is configured to detect the distance between the mobile terminal and the communicating device, based on an intensity of a radio wave detected by the communicating device.

6. The communication apparatus according to claim 3, wherein the controller is configured to change the disabling range according to identification information for identifying the mobile terminal.

7. The communication apparatus according to claim 6, wherein the communication apparatus is connectable to a server over a network, and the controller is configured to access the server to obtain the disabling range corresponding to the identification information.

8. The communication apparatus according to claim 1, wherein the controller is configured to, in the approach detection processing, detect the approach of the mobile terminal by using the communicating device to detect a radio wave transmitted by the mobile terminal.

9. The communication apparatus according to claim 8, wherein the radio wave transmitted by the mobile terminal is a response signal which is transmitted by the mobile terminal in response to a radio wave transmitted from the communication apparatus.

10. The communication apparatus according to claim 1,
wherein the at least one operation key is a plurality of operation keys comprising: at least one first operation key and at least one second operation key, wherein a minimum pressing force required for each of the at least one second operation key to accept an operation action is greater than a minimum pressing force required for each of the at least one first operation key to accept an operation action, and
wherein the controller is configured to disable the at least one first operation key as the at least one operation key in the disabling processing.

11. The communication apparatus according to claim 1, wherein the controller is configured not to disable, in the disabling processing, at least a portion of the at least one operation key to be disabled, and the at least the portion has a possibility of being used upon communication according to the short distance wireless communication standard.

12. The communication apparatus according to claim 11, further comprising a printing device configured to print an image based on print data,
wherein the controller is configured to execute:
a receiving processing in which the controller receives authentication information used for an authentication print, via at least one of the at least one operation key which is not disabled; and
a print processing in which when the authentication information received in the receiving processing coincides with authentication information attached to print data received from the mobile terminal, the controller controls the printing device to print the print data.

13. The communication apparatus according to claim 1, wherein the controller is configured to cancel disabling of at least one of the at least one operation key in the disabling processing, and the at least one of the at least one operation key has a possibility of being used upon communication according to the short distance wireless communication standard.

14. The communication apparatus according to claim 1, wherein the at least one operation key is disposed on a front portion of a housing of the communication apparatus.

15. A communication system, comprising:
a mobile terminal configured to perform communication according to a short distance wireless communication standard; and
the communication apparatus according to claim 1.

16. The communication apparatus according to claim 1,
wherein the operation panel is configured to output a signal generated in response to an acceptance of the operation action, and
wherein the controller ignores the signal output from the operation panel in the disabling processing.

17. The communication apparatus according to claim 1,
wherein, in the approach detection processing, the controller detects an approach state, as the approach of the mobile terminal, while a distance between the mobile terminal and the communication device is equal to or less than a first distance, and the controller does not detect the approach state while the distance is greater than the first distance.

18. A communication apparatus comprising:
a communicating device configured to communicate with a mobile terminal according to a short distance wireless communication standard;
at least one input receiver each configured to receive an input; and
a controller configured to execute a processing related to the input received by the at least one input receiver,
the controller being configured to execute:
an approach detection processing in which the controller detects an approach of the mobile terminal to the communicating device;
a disabling processing in which the controller disables at least a portion of the at least one input receiver in response to detection of the approach of the mobile terminal in the approach detection processing;
a moving-away detection processing in which the controller detects movement of the mobile terminal away from the communicating device; and
a cancellation processing in which when the controller has detected the movement of the mobile terminal away from the communicating device in the moving-away detection processing, the controller cancels the disabling of the at least the portion of the at least one input receiver.

* * * * *